(12) United States Patent
Chen et al.

(10) Patent No.: US 8,897,925 B2
(45) Date of Patent: Nov. 25, 2014

(54) HEAT DISSIPATION CONTROL SYSTEM AND CONTROL METHOD THEREOF

(75) Inventors: Chien-An Chen, Taipei (TW); Chih-Chien Lin, Taipei (TW)

(73) Assignee: Inventec Corporation, Taipei (TW)

(*) Notice: Subject to any disclaimer, the term of this patent is extended or adjusted under 35 U.S.C. 154(b) by 449 days.

(21) Appl. No.: 13/449,560

(22) Filed: Apr. 18, 2012

(65) Prior Publication Data

US 2013/0158738 A1 Jun. 20, 2013

(30) Foreign Application Priority Data

Dec. 14, 2011 (TW) .............................. 100146344 A (51) Int. Cl.
*G05D 23/00* (2006.01)
(52) U.S. Cl.
USPC .......................................... 700/299; 700/48
(58) Field of Classification Search
CPC ....... G05D 23/1932; G06F 1/20; G06F 1/206; G06N 3/0454

USPC ................................ 700/32, 45, 48, 299, 300
See application file for complete search history.

(56) References Cited

FOREIGN PATENT DOCUMENTS

TW          200630819      *  9/2006

* cited by examiner

*Primary Examiner* — Sean Shechtman
*Assistant Examiner* — Chad Rapp
(74) *Attorney, Agent, or Firm* — Huffman Law Group, PC (57) ABSTRACT

A heat dissipation control system comprises a sensing unit, an artificial neural network computing unit, and two heat dissipation units. The artificial neural network computing unit performs computation for controlling based on a plurality of electronic-device temperatures sent out by the sensing unit. The computation for controlling performs a back propagation algorithm on an objective function which is defined a as the square of an error function. Accordingly, cooling effects suitable for the heat dissipation units are generated in order to achieve an optimum heat dissipation effect.

20 Claims, 9 Drawing Sheets

Driving each of the heat dissipation elements by one of the driving signals corresponding to the highest rotational speed ── S800

FIG. 9

HEAT DISSIPATION CONTROL SYSTEM AND CONTROL METHOD THEREOF

CROSS-REFERENCE TO RELATED APPLICATIONS

This non-provisional application claims priority under 35 U.S.C. §119(a) on Patent Application No(s). 100146344 filed in Taiwan, R.O.C. on Dec. 14, 2011, the entire contents of which are hereby incorporated by reference.

BACKGROUND

1. Technical Field

The disclosure relates to a heat dissipation control system and more particularly to a heat dissipation control system for an electronic device.

2. Related Art

Fans are often used for generating forced convection inside electronic devices, such as servers, laptops, or desktop computers, for dissipating heat generated by them. Specifically, cold air outside the electronic device is introduced in the electronic device by the fans and flows inside the electronic device. Then, electronic components inside the electronic device exchange heat with the cold air. Next, the heated air flows out of the electronic device through an opening of the electronic device.

In order to prevent the electronic components from being overheated and therefore crashing, temperature sensors are disposed on the electronic components for monitoring the temperature of each of the electronic components. And, a controller is used for adjusting the fan speed according to the temperature of the electronic components sensed by the temperature sensors.

However, taking a server as an example, since it has many electronic components, each of which generates heat during operation, the temperature distribution inside the server will be very complicated due to the heat exchanges among those electronic components. Accordingly, it is necessary to improve the algorithm of the controller for controlling each fan inside the electronic device at a proper speed so that the temperature inside the server can be effectively reduced. Specifically, in order to achieve an optimum heat dissipation efficiency and save energy, the controller must control the fans to run at different speeds. Therefore, how to control the speed of the fans to effectively dissipate heat inside the electronic device is a problem to be solved.

SUMMARY

In some embodiments, a heat dissipation control system for an electronic device comprises a sensing unit, an artificial neural network computing unit, and a heat dissipation unit. The sensing unit is adapted to sense electronic-device temperatures of parts of the electronic device. The artificial neural network computing unit is adapted to receive the electronic-device temperatures and compare the electronic-device temperatures with a plurality of preset temperatures, respectively. When the electronic-device temperatures are different from the corresponding preset temperatures, the artificial neural network computing unit performs computations for controlling based on the electronic-device temperatures, respectively, in order to generate a plurality of control signals, and each of the computations for controlling performs a back propagation algorithm on an objective function defined as the square of an error function. The heat dissipation unit comprises a first heat dissipation element which receives the control signals, and is driven by one of the control signals.

The objective functions are defined as follows:

$$J_i = \frac{1}{2}E_i^2 = \frac{1}{2}(r_i - y_i)^2$$

where $J_i$ is the objective function, $E_i$ is the error function, of the computation for controlling, $r_i$ is the preset temperature, $y_i$ is the electronic-device temperatures, for i: 1~n.

A heat dissipation control method disclosed in an embodiment comprises following steps. A plurality of electronic-device temperatures of different parts of an electronic device is captured by a sensing unit; the electronic-device temperatures are received by an artificial neural network computing unit, respectively, and the electronic-device temperatures are compared with a plurality of preset temperatures; when the electronic-device temperatures are different from the preset temperatures, a computation for controlling is performed by the artificial neural network computing unit based on the electronic-device temperatures respectively in order to generate a plurality of control signals. The computation for controlling performs a back propagation algorithm on an objective function defined as the square of an error function. The control signals are output simultaneously to a heat dissipation unit by the artificial neural network computing unit, and each of the heat dissipation units is driven by one of the control signals.

According to the heat dissipation control system and control method disclosed in the embodiments, a back propagation algorithm is performed on the objective function which is defined as the square of the error function in order to generate the rotational speed value suitable for each of the heat dissipation units. Thereby, compared with the conventional controllers, the heat-dissipation output of each of the heat dissipation units can be computed more precisely by the artificial neural network computing unit, and therefore a better heat dissipation effect can be achieved for the electronic device by the heat dissipation control system of the disclosure, and the energy required by the operation of the heat dissipation units can also be reduced.

The present invention will become more fully understood by reference to the following detailed description thereof when read in conjunction with the attached drawings.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
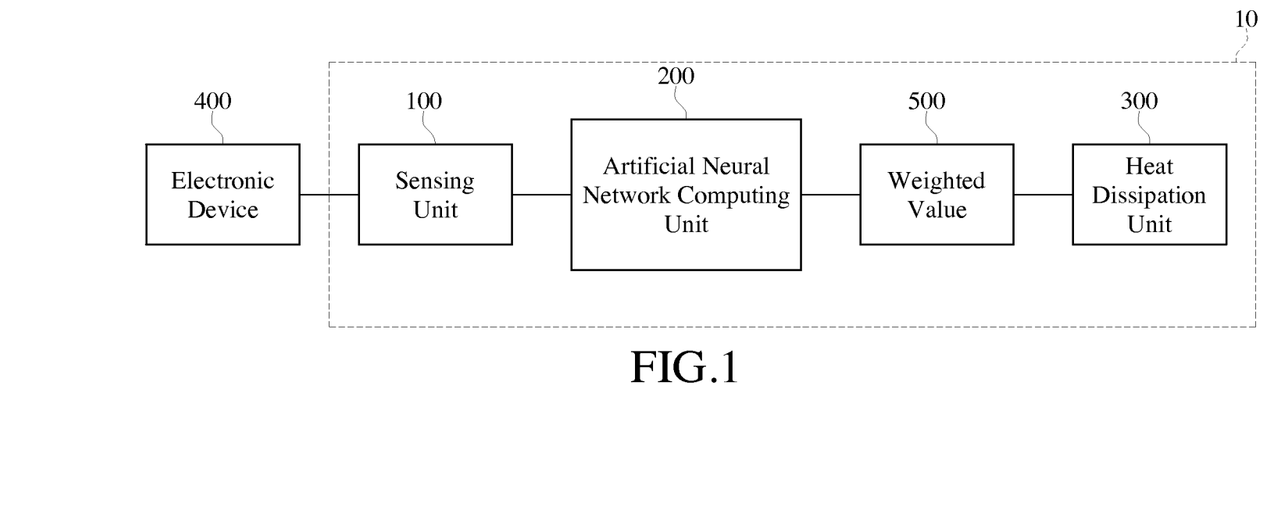
FIG. 1 is a block diagram of a heat dissipation control system according to a first embodiment of the disclosure.
Figure 2:
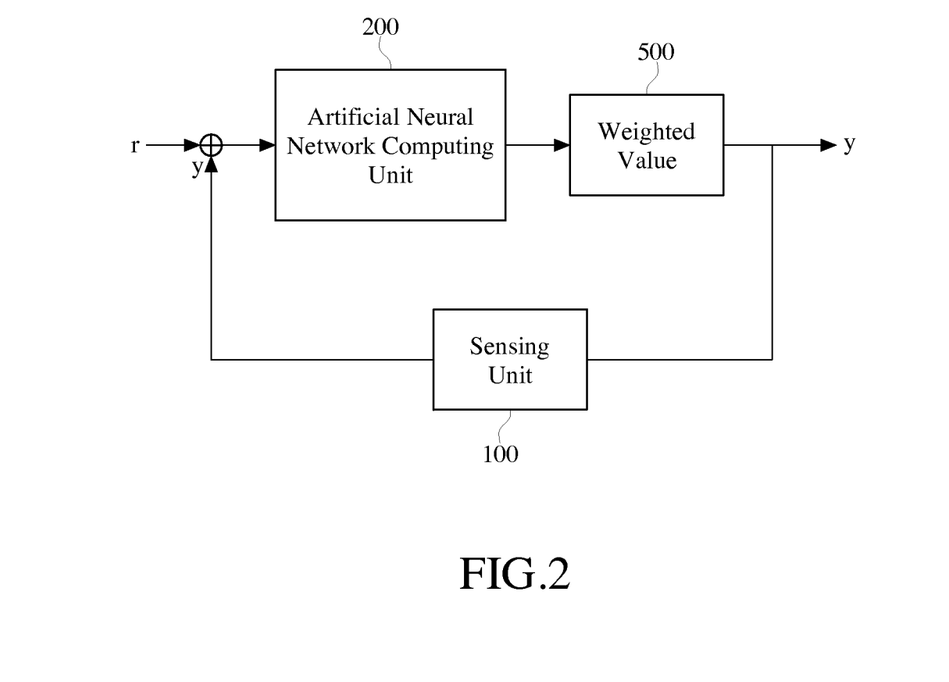
FIG. 2 is a block diagram of control procedures of FIG. 1.

Referring to FIGS. 1 and 2, FIG. 1 is a block diagram of a heat dissipation control system according to a first embodiment of the disclosure, and FIG. 2 is a flow chart of control procedures the heat dissipation control system 10 of FIG. 1. A heat dissipation control system 10 of this embodiment is adapted to be disposed in an electronic device 400. The electronic device 400 comprises a plurality of electronic components such as central processing unit, memory card and display card. The electronic device 400 can be a server, a desktop computer, a laptop or a tablet computer. In this embodiment, a server is taken as an example, but the disclosure is not limited to it.

The heat dissipation control system 10 of this embodiment comprises a sensing unit 100, an artificial neural network computing unit 200, and a heat dissipation unit 300. The sensing unit 100 comprises a plurality of sensors, and each of the sensors is adopted to sense the electronic-device temperature of a component or of a position within or about the electronic device 400. The artificial neural network computing unit 200 comprises a plurality of artificial neural network controllers, and the number of the artificial neural network controllers corresponds to the number of the sensors. The electronic-device temperature sensed by each of the sensors is sent to a corresponding artificial neural network controller. Then, each of the artificial neural network controllers performs a computation for controlling in order to generate a control signal. The heat dissipation unit 300 comprises a plurality of heat dissipation elements. Each of the control signals is sent to a corresponding heat dissipation element for controlling it. The number of the heat dissipation elements can be determined based on various requirements and it is not limited to be the same as the number of the electronic components or the number of the artificial neural network controllers. In some embodiments, the heat dissipation element is, for example, a fan.

Furthermore, because the distance from one of the heat dissipation elements to one of the electronic components is typically different from the distance from the one of the heat dissipation elements to another electronic component, the heat-dissipation effects of the one of the heat dissipation elements to different ones of the electronic components are also different. For example, when the heat dissipation elements are in operation, the heat dissipation efficiency for the electronic component closest to the one of the heat dissipation elements is usually better than that for another electronic component that is farther away from the one of the heat dissipation elements. Accordingly, the control signals can be further adjusted by weighted values 500 which reflect the heat-dissipation effects of a first heat dissipation element to different electronic elements. Since the differences of the heat dissipation effects of the heat dissipation elements to the electronic components are quantized by the weighted values 500, the output power of each of the heat dissipation elements can be controlled more precisely by the artificial neural network controllers.

Furthermore, as shown in FIG. 2, the heat dissipation control system 10 is a feedback control system. The temperature of the electronic device 400 is monitored continuously by the sensing unit 100, so that the output power of the heat dissipation unit 300 can be tracked and adjusted continuously.

Before running the computation for controlling, the heat dissipation control system 10 compares the electronic-device temperatures with a plurality of corresponding preset temperatures. The preset temperatures can be corresponding to the electronic components or different locations corresponding to the electronic device. In this and some embodiments, each of the electronic components has a preset temperature. Taking a central processing unit (CPU) as an example, the performance of it is good when its temperature is below 60 degrees Celsius, and a probability of crashing of the CPU is relatively higher when its temperature is over 60 degrees Celsius. Accordingly, the preset temperature of the central processing unit may be 77 degrees Celsius.

When the electronic-device temperatures are different from the preset temperatures, the artificial neural network computing unit 200 performs the computations for controlling based on the electronic-device temperatures, respectively, in order to generate the control signals. In this embodiment and some embodiments, each of the computations for controlling performs a back propagation algorithm to an objective function which equals the square of an error function. The objective function is $$J_i = \frac{1}{2}E_i^2 = \frac{1}{2}(r_i - y_i)^2$$

Wherein $J_i$ is the objective function, $E_i$ is the error function of the computation for controlling, $r_i$ is the preset temperature, $y_i$ is the electronic-device temperature, for i: 1~n.

The back propagation algorithm is:

$$W_{hyi}(k+1) = W_{hyi}(k) - \eta \frac{\partial J_i}{\partial W_{hyi}(k)}$$

where $J_i$ is the objective function, $W_{hyi}$ is the weighted value of the artificial neural network, k is sampling point, (k+1) is a next sampling point, and $\eta$ is an adjustment speed rate, where i: 1~n.

The term $$\frac{\partial J_i}{\partial W_{hyi}(k)}$$

is defined as follows:

$$\frac{\partial J_i}{\partial W_{hyi}} = \frac{\partial J_i}{\partial E_i}\frac{\partial E_i}{\partial y_i}\frac{\partial y_i}{\partial v_i}\frac{\partial x_{yi}}{\partial u_{yi}}\frac{\partial u_{yi}}{\partial W_{hyi}}$$

where $J_i$ is the objective function, $E_i$ is the error function of the computations for controlling, $y_i$ is the electronic-device temperature, $v_i$ is the control signal, $x_{yi}$ is an output of the computation for controlling, and $u_{yi}$ is an input of the computation for controlling, for i: 1~n.

The partial differentials defined as follows:

$$\frac{\partial J_i}{\partial E_i} = (r_i - y_i)$$

$$\frac{\partial E_i}{\partial y_i} = -1$$

-continued $$\frac{\partial y_i}{\partial v_i} = \text{sgn}[(y_i(k) - y_i(k-1)) * (v_i(k-1) - v_i(k-2))]$$

$$\frac{\partial x_{yi}}{\partial u_{yi}} = 1$$

$$\frac{\partial u_{yi}}{\partial W_{hyi}} = x_{hi}$$

where $J_i$ is the objective function, $E_i$ is the error function of the computation for controlling, $r_i$ is the preset temperature, $y_i$ is the electronic-device temperature, k is a sampling point, (k−1) is a last sampling point, $v_i$ is the control signal, $x_{yi}$ is an output of the computation for controlling, $u_{yi}$ is an input of the computation for controlling, $W_{hyi}$ is the weighted value of the artificial neural network, and $x_{hi}$ is a plurality of gain variables, for i: 1~n.

Each of the gain variables includes a ratio parameter, a differential parameter, and an integral parameter. The ratio parameter, the differential parameter, and the integral parameter are shown below:

$$x_{hi1}(k) = \begin{cases} 1, & u_{hi1}(k) > 1 \\ u_{hi1}(k), & -1 \leq u_{hi1}(k) \leq 1 \\ -1, & u_{hi1}(k) < -1 \end{cases}$$

$$x_{hi2}(k) = \begin{cases} 1, & u_{hi2}(k) > 1 \\ u_{hi2}(k) + u_{hi2}(k-1), & -1 \leq u_{hi2}(k) \leq 1 \\ -1, & u_{hi2}(k) < -1 \end{cases}$$

$$x_{hi3}(k) = \begin{cases} 1, & u_{hi3}(k) > 1 \\ u_{hi3}(k) - u_{hi3}(k-1), & -1 \leq u_{hi3}(k) \leq 1 \\ -1, & u_{hi3}(k) < -1 \end{cases}$$

where $x_{hi1}$ is the ratio parameter of one of the gain variables, $x_{hi2}$ is the integral parameter of one of the gain variables, and $x_{hi3}$ is the differential parameter of one of the gain variables, for i: 1~n.

Figure 3:
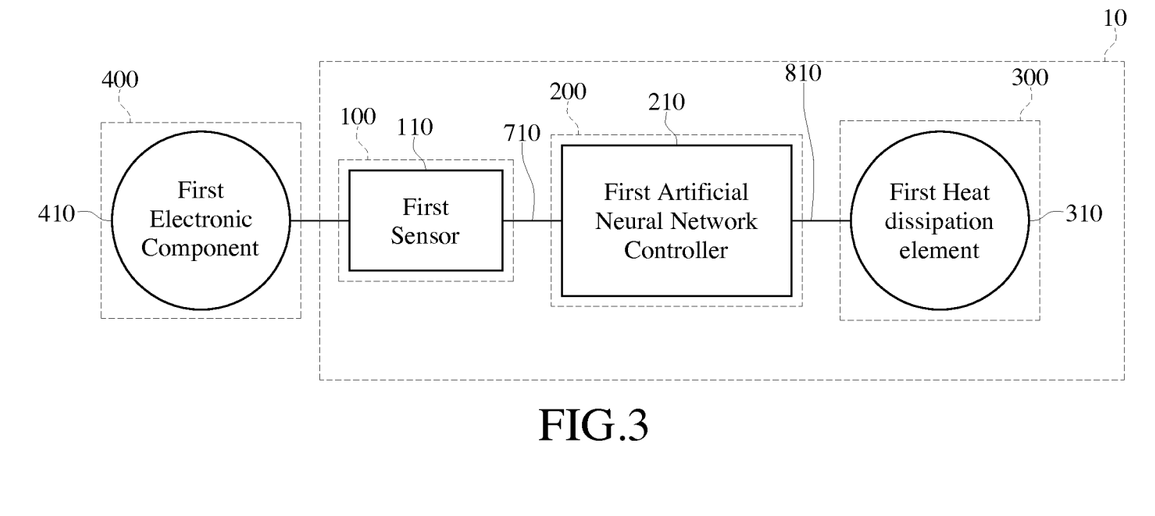
FIG. 3 is a block diagram of the heat dissipation control system according to a second embodiment of the disclosure.

FIG. 3 is a block diagram of the heat dissipation control system according to a second embodiment of the disclosure. An electronic device 400 of the second embodiment has an electronic component (a first electronic component 410).

A heat dissipation control system 10 of this embodiment comprises a sensing unit 100, an artificial neural network computing unit 200, and a heat dissipation unit 300. The sensing unit 100 has a first sensor 110 for monitoring the first electronic component 410 and for outputting a first electronic-device temperature 710. The artificial neural network computing unit 200 has a first artificial neural network controller 210 for receiving the first electronic-device temperature 710 and performing the computations for controlling in order to generate a first control signal 810. The heat dissipation unit 300 has a first heat dissipation element 310, and an output power of the first heat dissipation element 310 is determined based on the first control signal 810.

In this embodiment, since the sensing unit 100, the artificial neural network computing unit 200, and the heat dissipation unit 300 only have one sensor (first sensor 110), one artificial neural network controller (first artificial neural network controller 210), and one heat dissipation element 310 (first heat dissipation element 310), respectively, no weighted value is required.

Figure 4:
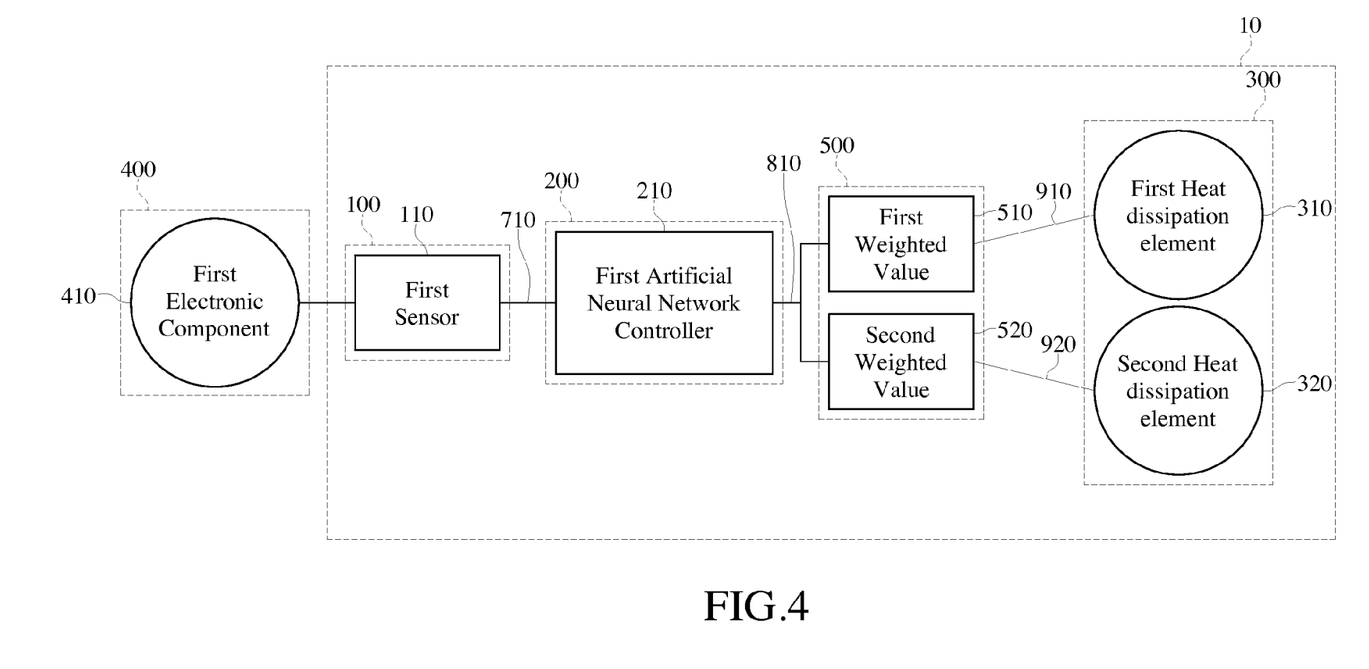
FIG. 4 is a block diagram of the heat dissipation control system according to a third embodiment of the disclosure.

FIG. 4 is a block diagram of the heat dissipation control system according to a third embodiment of the disclosure. An electronic device 400 of the third embodiment has an electronic component (the first electronic component 410).

A heat dissipation control system 10 of this embodiment comprises a sensing unit 100, an artificial neural network computing unit 200, weighted values 500, and a heat dissipation unit 300. The sensing unit 100 has a first sensor 110 for monitoring the first electronic component 410 and for outputting a first electronic-device temperature 710. The artificial neural network computing unit 200 has a first artificial neural network controller 210 for receiving the first electronic-device temperature 710 and performing a computations for controlling in order to generate a first control signal 810. The heat dissipation unit 300 has a first heat dissipation element 310 and a second heat dissipation element 320, the first heat dissipation element 310 and the second heat dissipation element 320 corresponding to a first weighted value 510 and a second weighted value 520, respectively, because the first heat dissipation element 310 and the second heat dissipation element 320 have different heat dissipation effects on the first electronic component 410. The first artificial neural network controller 210 generates the first control signal 810. Then, the first control signal 810 is multiplied by the first weighted value 510 to form a first driving signal 910, and it is multiplied by the second weighted value 520 to form a second driving signal 920. The driving signals 910, 920 are sent to the first heat dissipation element 310 and the second heat dissipation element 320, respectively, in order to control them 310, 320.

If the temperature of the first electronic component 410 is only a bit higher than the preset temperature, the first heat dissipation element 310 can be turned on and the second heat dissipation element 320 can be turned off by the first artificial neural network controller 210. If the temperature of the first electronic component 410 is a lot higher than the preset temperature, both the first heat dissipation element 310 and the second heat dissipation element 320 can be turned on by the first artificial neural network controller 210, so that the heat generated by the first electronic component 410 can be eliminated quickly.

Figure 5:
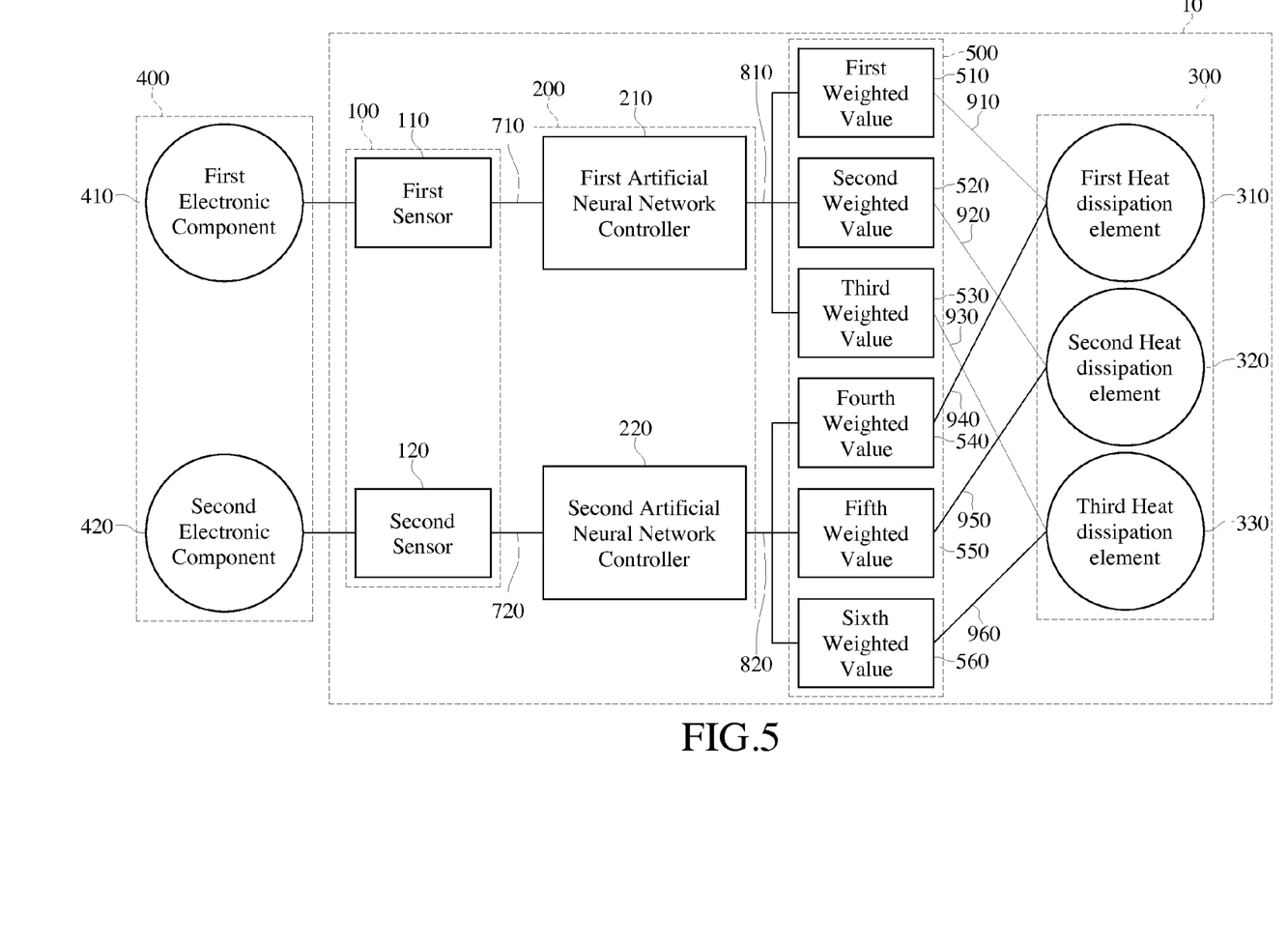
FIG. 5 is a block diagram of the heat dissipation control system according to a fourth embodiment of the disclosure.

FIG. 5 is a block diagram of the heat dissipation control system according to a fourth embodiment of the disclosure. An electronic device 400 of the fourth embodiment has two electronic components (a first electronic component 410 and a second electronic component 420).

A heat dissipation control system 10 of this embodiment comprises a sensing unit 100, an artificial neural network computing unit 200, weighted values, and a heat dissipation unit 300. The sensing unit 100 has a first sensor 110 for sensing the temperature of the first electronic component 410 and for outputting the first electronic-device temperature 710. The sensing unit 100 and has a second sensor 120 for sensing the temperature of the second electronic component 420 and for outputting a second electronic-device temperature 720.

The artificial neural network computing unit 200 has a first artificial neural network controller 210 and a second artificial neural network controller 220. The first artificial neural network controller 210 performs the computations for controlling based on the first electronic-device temperature 710 in order to generate a first control signal 810. The second artificial neural network controller 220 performs the computations for controlling based on the second electronic-device temperature 720 in order to generate a second control signal 820.

The heat dissipation unit 300 has a first heat dissipation element 310, a second heat dissipation element 320, and a third heat dissipation element 330. The first control signal 810 and the second control signal 820 are transmitted to the heat dissipation elements 310, 320, 330 after the signals 810, 820 are adjusted by weighted values 510, 520, 530, 540, 550, 560 corresponding to the heat dissipation elements 310, 320, 330. In this embodiment, because the first heat dissipation element 310, the second heat dissipation element 320, and the third heat dissipation element 330 have different heat dissipation effects on the first electronic component 410 and the second electronic component 420, the first control signal 810 is adjusted with the first weighted value 510, the second weighted value 520, and the third weighted 530, respectively, to form a first driving signal 910, a second driving signal 920, and a third driving signal 930. The second control signal 820 is adjusted with the fourth weighted value 540, the fifth weighted value 550, and the sixth weighted value 530, respectively, to form a fourth driving signal 940, a fifth driving signal 950, and a sixth driving signal 960. The first driving signal 910 and the fourth driving signal 940 are transmitted to the first heat dissipation element 310 at the same time. The second driving signal 920 and the fifth driving signal 950 are transmitted to the second heat dissipation element 320 at the same time. And the third driving signal 930 and the sixth driving signal 960 are transmitted to the third heat dissipation element 330 at the same time. Then, in order to meet the heat dissipation requirements of the electronic components 410, 420, each of the heat dissipation elements 310, 320, 330 is driven by the driving signal that has the maximum value of all driving signals associated with a particular heat dissipation element 310, 320, 330.

For example, if the first heat dissipation element 310 is a fan, and the rotational speed of the first heat dissipation element 310 driven by the first driving signal 910 is 100 rpm, and the rotational speed of the first heat dissipation element 310 driven by the fourth driving signal 940 is 80 rpm, then the first heat dissipation element 310 will be driven by the first driving signal 910 and, therefore, will operate at the rotational speed of 100 rpm.

Figure 6:
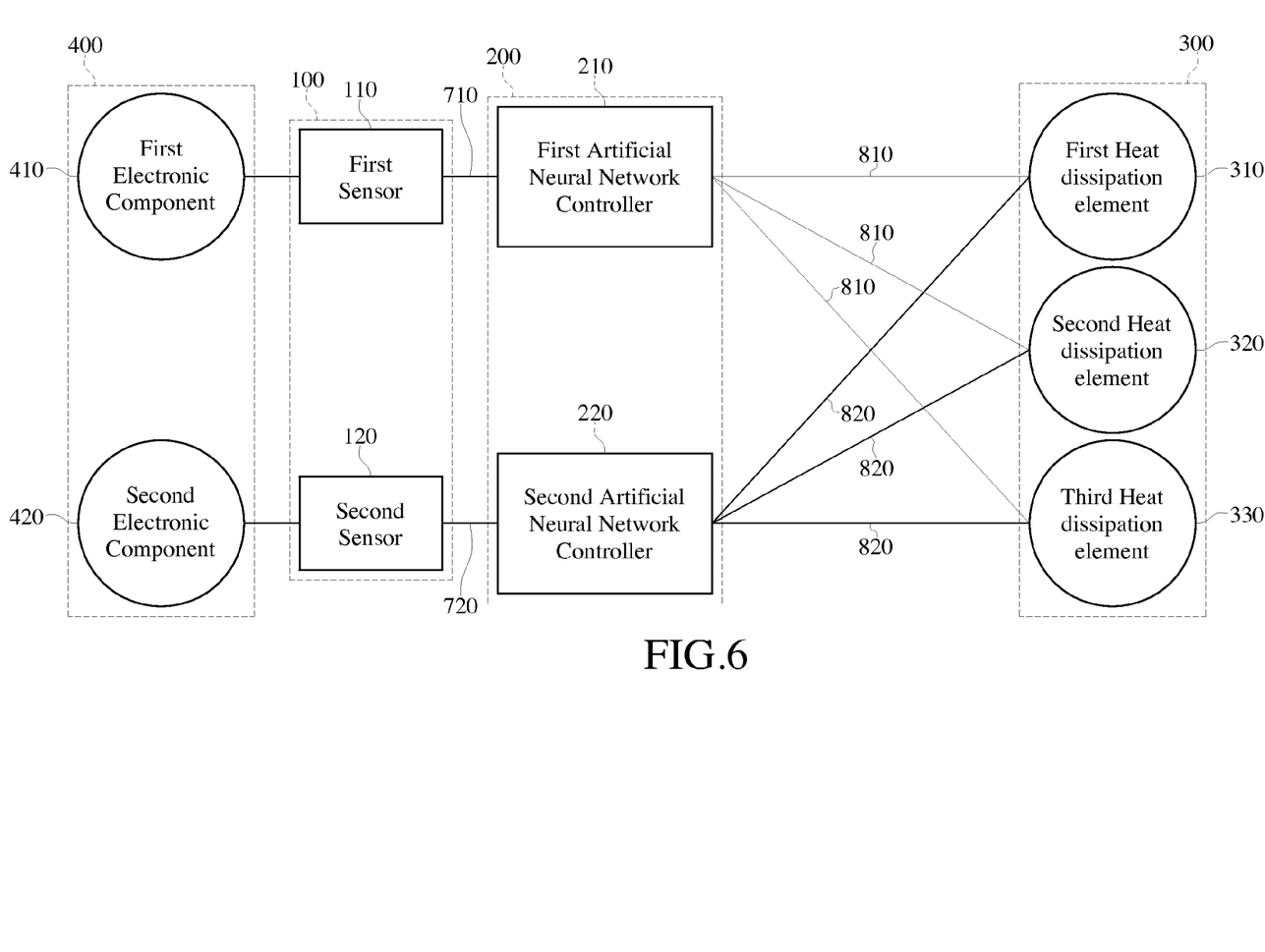
FIG. 6 is a block diagram of FIG. 5 without the weighted values added.
Figure 7:
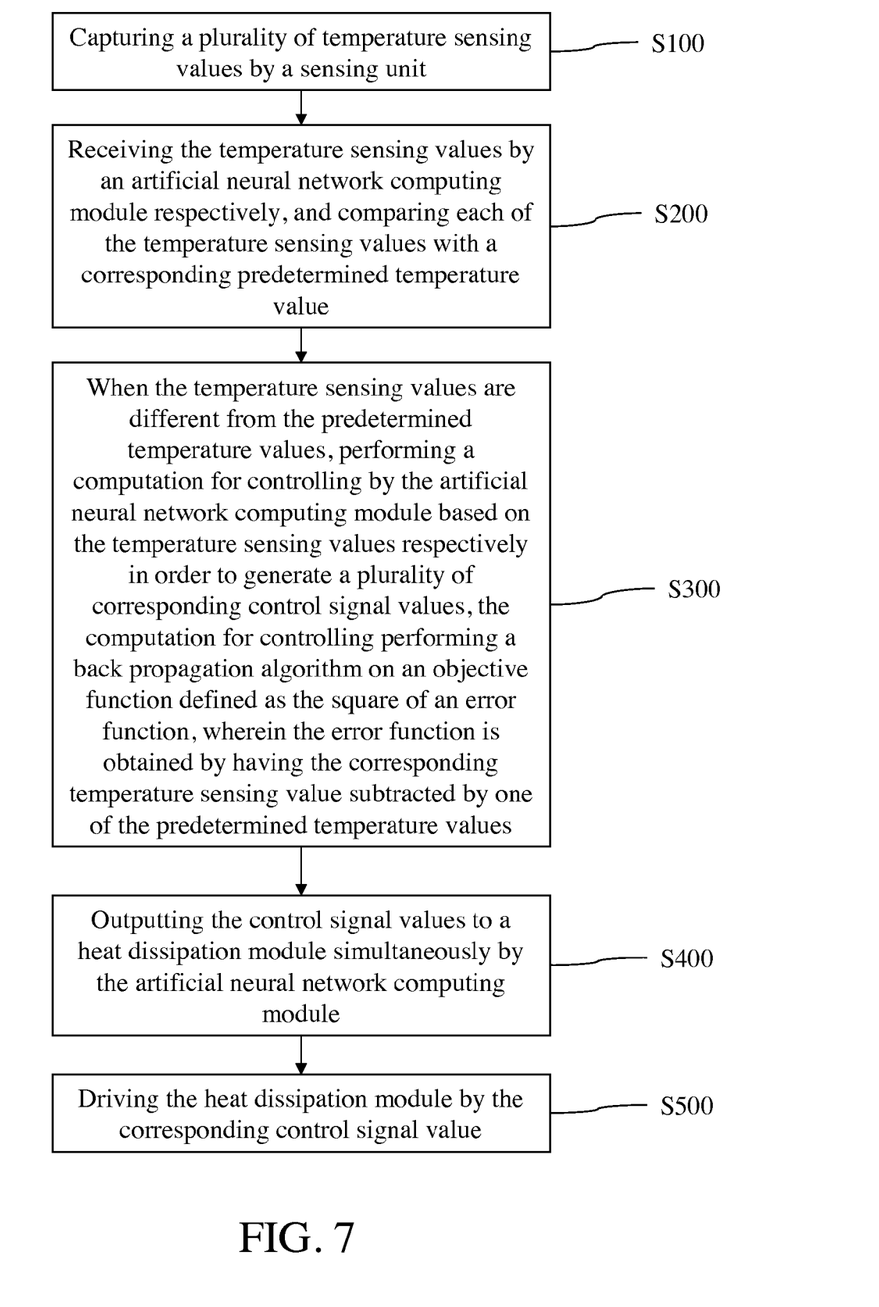
FIGS. 7 to 9 are flow charts of steps of a control method of FIG. 5.
Figure 8:
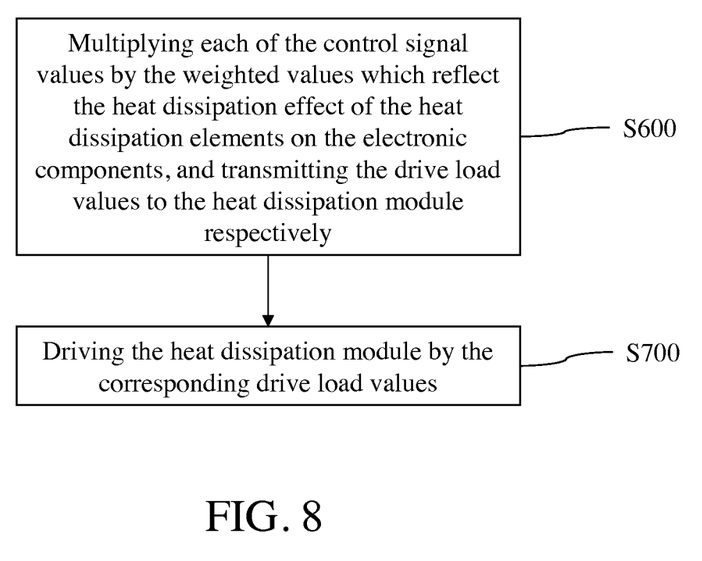
Figure 9:
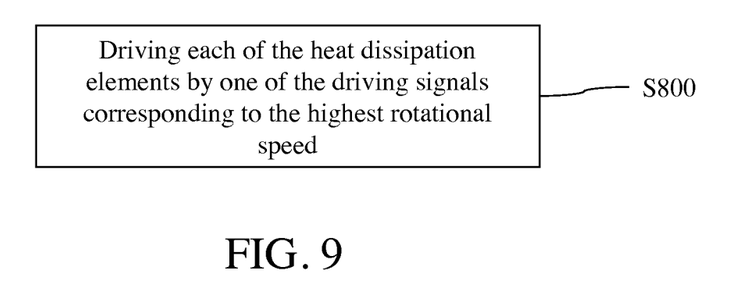

The control method of the heat dissipation control system 10 is described below. Referring to FIGS. 5 through 9, FIG. 6 is a block diagram of the heat dissipation control system 10 in FIG. 5 without the weighted values 500 added, and FIGS. 7 to 9 are flow charts of the control method of the heat dissipation control system 10 in FIG. 5.

Following steps are processed without the weighted values. First, referring to FIGS. 6 and 7, in a step S100, a plurality of electronic-device temperatures is captured by a sensing unit 100. For example, the first electronic component 410 and the second electronic component 420 are monitored by the first sensor 110 and the second sensor 120, respectively, in order to generate the first electronic-device temperature 710 and the second electronic-device temperature 720.

In a step S200, the electronic-device temperatures 710, 720 are received by a corresponding artificial neural network computing unit 210, 220 and each of the electronic-device temperatures 710, 720 is compared with a corresponding preset temperature.

In a step S300, when the electronic-device temperatures 710, 720 are different from the preset temperatures, a computation for controlling is performed by the artificial neural network computing unit 210, 220 based on the electronic-device temperatures 710, 720, respectively, in order to generate a plurality of corresponding control signals 810, 820. In the computation for controlling, a back propagation algorithm is performed on an objective function which is defined as the square of an error function. In other words, each of the electronic-device temperatures 710, 720 is processed with a computation for controlling in order to generate a corresponding control signal 810, 820.

Detailed description is given as an example in following paragraphs to explain steps when the electronic-device temperatures 710, 720 are different from the corresponding preset temperatures 810, 820.

Turning to what is shown in FIG. 5, the first electronic-device temperature 710 is transmitted to the first artificial neural network controller 210, and is compared to the first preset temperature of the first electronic element 410. When the first electronic-device temperature 710 is smaller than the first preset temperature, a computation for controlling is performed by the first artificial neural network controller 210 in order to generate the first control signal 810. The first control signal 810 is then transmitted to the first heat dissipation element 310, second heat dissipation element 320, and third heat dissipation element 330, so that the current rotational speeds of the corresponding heat dissipation elements 310, 320 and 330 are maintained or reduced, and therefore the power consumptions of the heat dissipation elements 310, 320, 330 can be saved.

When the first electronic-device temperature 710 is higher than the first preset temperature, a computation for controlling is performed by the first artificial neural network controller 210 in order to generate the first control signal 810. The control signal 810 adjusted with weighted values 500 is then transmitted to the heat dissipation elements 310, 320 and 330, so that the rotational speeds of the corresponding heat dissipation elements 310, 320 and 330 can be increased, and therefore the heat generated by the first electronic component can be dissipated quickly. The computation for controlling is the same as that disclosed above and thus will not be described herein again.

In a step S400, the control signals are output to the heat dissipation units 310, 320, 330 simultaneously by the artificial neural network computing unit 210. For example, as shown in FIG. 5, the first control signal 810 is outputted to the first heat dissipation element 310, the second heat dissipation element 320, and the third heat dissipation element 330 at the same time by the first artificial neural network controller 210; and the second control signal 820 is outputted to the first heat dissipation element 310, the second heat dissipation element 320, and the third heat dissipation element 330 at the same time by the second artificial neural network controller 220. Therefore, the first control signal 810 and the second control signal 820 are transmitted to the first heat dissipation element 310 at the same time. By the same token, the first control signal 810 and the second control signal 820 are received by the second heat dissipation element 320, and the third heat dissipation element 330 at the same time.

In a step S500, the heat dissipation unit 300 is driven by the corresponding control signals 810, 820. For example, the first heat dissipation element 310 is controlled by the first control signal 810 or by the second control signal 820. The second heat dissipation element 320 and the third heat dissipation element 330 are controlled in like manner.

However, because the distances between each of the heat dissipation elements 310, 320, 330 and each of the electronic components 410, 420 are different, each of the heat dissipation elements 310, 320, 330 has a different heat dissipation effect one each of the electronic components 410, 420. When the heat dissipation elements 310, 320, 330 are in operation, better heat dissipation effects can be provided for the closest electronic components 410, 420 as opposed to those away from because the closest electronic components 410, 420 experience a greater cooling effect. Therefore, different weighted values are used to reflect the different heat-dissipation effects of the heat dissipation elements on the electronic components so that the heat dissipation elements can be operated with more precise output power values. In this embodiment, a plurality of the weighted values 500 is used in the heat dissipation control system 10.

Please refer to FIGS. 5 and 8. In a step S600, each of the control signals 810, 820 is multiplied by the weighted values 500 which reflect the heat dissipation effect of the heat dissipation elements 310, 320, 330 on the electronic components 410, 410, in order to generate a plurality of corresponding driving signals 910, 920, 930, 940, 950, 960. The driving signals 910, 920, 930, 940, 950, 960 are transmitted to their associated heat dissipation element 310, 320, 330. In a step S700, each of the heat dissipation elements is driven by one its corresponding driving signals 910, 920, 930, 940, 950, 960.

For example, as shown in FIG. 5, by using the weighted values 500 which reflect the heat dissipation effects of the heat dissipation elements 310, 320, 330 on the electronic components 410, 420, such as the first weighted value 510, the second weighted value 520, and a third weighted value 530, the degree of effect of the first heat dissipation element 310, the second heat dissipation element 320, and the third heat dissipation element 330 on the first electronic component 410 can be simulated.

By the same token, a fourth weighted value 540, a fifth weighted value 550, and a sixth weighted value 560 are used to reflect the heat dissipation effects of the first heat dissipation element 310, the second heat dissipation element 320, and the third heat dissipation element 330 on the second electronic component 420.

The first control signal 810 is multiplied by the first weighted value 510 to form the first driving signal 910, and the second control signal 820 is multiplied by the fourth weighted value 540 to form the fourth driving signal 940. Then, the first driving signal 910 is transmitted to the first heat dissipation element 310 by the first artificial neural network controller 210, and the fourth driving signal 940 is transmitted to the first heat dissipation element 310 by the second artificial neural network controller 220.

Likewise, the second driving signal 920 and the fifth driving signal 950 are transmitted to the second heat dissipation element 320, and the third driving signal 930 and the sixth driving signal 960 are transmitted to the third heat dissipation element 330.

Referring to FIGS. 1 and 5, in a step S800, in order to prevent the electronic components from crashing due to the electronic components being overheated, the heat dissipation elements have to properly remove the heat generated by the electronic components. Each of the heat dissipation elements is driven by one of the driving signals corresponding to the highest rotational speed, or by the driving signal which will yield the greatest cooling effect.

For example, if the rotational speed of the first heat dissipation element 310 driven by the first driving signal 910 is 100 rpm, and the rotational speed driven by the fourth driving signal 940 is 80 rpm, the first heat dissipation element 310 will operate at the rotational speed of 100 rpm.

According to the heat dissipation control system and control method disclosed in the embodiments, a back propagation algorithm is performed on the objective function which is defined as the square of the error function in order to have the rotational speed value suitable for each of the heat dissipation units. Thereby, compared with conventional controllers, the heat-dissipation output of each of the heat dissipation elements can be computed more precisely by the artificial neural network computing unit. Consequently, a better heat dissipation effect for the electronic device can be achieved by the heat dissipation control system of the disclosure, and the energy required by the operation of the heat dissipation units can also be reduced.

Furthermore, since the heat-dissipation effect of the heat dissipation unit on the electronic components is taken into consideration by using the weighted value, the artificial neural network computing unit is able to adjust the heat dissipation unit to operate with an optimum heat dissipating efficiency.

Note that the specifications relating to the above embodiments should be construed as exemplary rather than as limiting according to the present invention, with many variations and modifications being readily attainable by a person of average skill in the art without departing from the spirit or scope thereof as defined by the appended claims and their legal equivalents.

What is claimed is:

1. A heat dissipation control system for an electronic device, comprising:
a sensing unit for capturing a plurality of electronic-device temperatures of parts of the electronic device;
an artificial neural network computing unit, for receiving the electronic-device temperatures and comparing the electronic-device temperatures to a plurality of preset temperatures, respectively, wherein when the electronic-device temperatures are different from the corresponding preset temperatures the artificial neural network computing unit performs a computation for controlling based on the electronic-device temperatures, respectively, in order to generate a plurality of control signals, and wherein each of the computations for controlling include performing a back propagation algorithm on an objective function which is defined as a square of an error function; and
a heat dissipation unit, comprising a first heat dissipation element, the first heat dissipation element receiving the control signals and being driven by one of the control signals;
wherein the objective functions are defined as:

$$J_i = \frac{1}{2}E_i^2 = \frac{1}{2}(r_i - y_i)^2$$

and wherein $J_i$ is the objective function, $E_i$ is the error function of the computations for controlling, $r_i$ is the preset temperature, and $y_i$ is the electronic-device temperature, for i: 1~n.

2. The heat dissipation control system as recited in claim 1, wherein the back propagation algorithm is adapted to adjust a weighted value of an artificial neural network for making the object function close to a minimal value, and the back propagation algorithm is defined as:

$$W_{hy}(k+1) = W_{hy}(k) - \eta \frac{\partial J_i}{\partial W_{hy}(k)}$$

and wherein $J_i$ is the objective function, $W_{hyi}$ is the weighted value of the artificial neural network, k is sampling point, (k+1) is a next sampling point, and $\eta$ is an adjustment speed rate, for i: 1~n.

3. The heat dissipation control system as recited in claim 2, wherein $$\frac{\partial J_i}{\partial W_{hyi}} = \frac{\partial J_i}{\partial E_i} \frac{\partial E_i}{\partial y_i} \frac{\partial y_i}{\partial v_i} \frac{\partial x_{yi}}{\partial u_{yi}} \frac{\partial u_{yi}}{\partial W_{hyi}}$$

and wherein $J_i$ is the objective function, $E_i$ is the error functions of the computation for controlling, $y_i$ is the electronic-device temperature, $v_i$ is the control signals, $x_{yi}$ is an output of the computation for controlling, and $u_{yi}$ is an input of the computation for controlling, for i: 1~n.

4. The heat dissipation control system as recited in claim 3, wherein $$\frac{\partial J_i}{\partial E_i} = (r_i - y_i)$$

$$\frac{\partial E_i}{\partial y_i} = -1$$

$$\frac{\partial y_i}{\partial v_i} = \text{sgn}[(y_i(k) - y_i(k-1)) * (v_i(k-1) - v_i(k-2)]$$

$$\frac{\partial x_{yi}}{\partial u_{yi}} = 1$$

$$\frac{\partial u_{yi}}{\partial W_{hyi}} = x_{hi}$$

and wherein $J_i$ is the objective function, $E_i$ is the error functions of the computation for controlling, $r_i$ is the preset temperatures, $y_i$ is the electronic-device temperature, k is a sampling point, (k−1) is a last sampling point, $v_i$ is the control signals, $x_{yi}$ is an output of the computation for controlling, $u_{yi}$ is an input of the computation for controlling, $W_{hyi}$ is the weighted value of the artificial neural network, and $x_{hi}$ is a gain variable.

5. The heat dissipation control system as recited in claim 4, wherein each of the gain variables includes a ratio parameter, a differential parameter, and an integral parameter, and wherein the ratio parameter, the differential parameter, and the integral parameter are respectively defined as:

$$x_{hi1}(k) = \begin{cases} 1, & u_{hi1}(k) > 1 \\ u_{hi1}(k), & -1 \le u_{hi1}(k) \le 1 \\ -1, & u_{hi1}(k) < -1 \end{cases}$$

$$x_{hi2}(k) = \begin{cases} 1, & u_{hi2}(k) > 1 \\ u_{hi2}(k) + u_{hi2}(k-1), & -1 \le u_{hi2}(k) \le 1 \\ -1, & u_{hi2}(k) < -1 \end{cases}$$

$$x_{hi3}(k) = \begin{cases} 1, & u_{hi3}(k) > 1 \\ u_{hi3}(k) - u_{hi3}(k-1), & -1 \le u_{hi3}(k) \le 1 \\ -1, & u_{hi3}(k) < -1 \end{cases}$$

and wherein $x_{hi1}$ is the ratio parameter of one of the gain variables, $x_{hi2}$ is the integral parameter of one of the gain variables, and $x_{hi3}$ is the differential parameter of one of the gain variables, for i: 1~n.

6. The heat dissipation control system as recited in claim 1, wherein the first heat dissipation element has a plurality of weighted values corresponding to each part of the electronic device, and wherein each of the control signals is multiplied by each of the weighted values generated by the artificial neural network computing unit for generating a plurality of driving signals.

7. The heat dissipation control system as recited in claim 6, wherein the first heat dissipation element receives the driving signals at the same time and is driven by the driving signal corresponding to a highest rotational speed value.

8. The heat dissipation control system as recited in claim 1, wherein the heat dissipation unit further comprises a second heat dissipation element, the second heat dissipation element having a plurality of weighted values corresponding to each part of the electronic device, wherein each of the control signals is multiplied by each of the weighted values generated by each of the artificial neural network computing units for generating a plurality of driving signals.

9. The heat dissipation control system as recited in claim 1, wherein the first heat dissipation element is a fan.

10. A heat dissipation control method, comprising:
capturing a plurality of electronic-device temperatures corresponding to different parts of an electronic device by a sensing unit;
receiving the electronic-device temperatures by an artificial neural network computing unit respectively, and comparing each of the electronic-device temperatures with a corresponding preset temperature;
when the electronic-device temperatures are different from the preset temperatures, performing a computation for controlling by the artificial neural network computing unit based on the electronic-device temperatures for generating a plurality of corresponding control signals, and performing a back propagation algorithm by the computation for controlling on an objective function which is defined as a square of an error function, wherein the error function is generated by having the corresponding electronic-device temperature subtracted by a corresponding one of the preset temperatures;
outputting the control signals to a heat dissipation unit simultaneously from the artificial neural network computing unit; and
driving the heat dissipation unit by one of the control signals.

11. The heat dissipation control method as recited in claim 10, wherein the step of outputting the control signals to the heat dissipation unit simultaneously from the artificial neural network computing unit further comprises:
multiplying each of the control signals by weighted values which reflect the heat dissipation effect of the dissipation unit to elements to be cooled in order to generate a plurality of corresponding driving signals, and transmitting the driving signals to the heat dissipation unit, respectively; and
driving the heat dissipation unit by the corresponding driving signals.

12. The heat dissipation control method as recited in claim 11, wherein the step of driving the heat dissipation unit by the corresponding driving signals further comprises a step of:
driving the heat dissipation unit by the driving signals corresponding to the highest rotational speed.

13. A heat dissipation control system for a server, comprising:
a sensing unit for capturing a plurality of electronic-device temperatures of parts of the server;
an artificial neural network computing unit, for receiving the electronic-device temperatures and comparing the electronic-device temperatures to a plurality of preset temperatures, respectively, wherein when the electronic-device temperatures are different from the corresponding preset temperatures the artificial neural network computing unit performs a computation for controlling based on the electronic-device temperatures, respectively, in order to generate a plurality of control signals, and wherein each of the computations for controlling include performing a back propagation algorithm on an objective function which is defined as a square of an error function; and a fan unit, comprising a first fan, the first fan receiving the control signals and being driven by one of the control signals;

wherein the objective functions are defined as:

$$J_i = \frac{1}{2}E_i^2 = \frac{1}{2}(r_i - y_i)^2$$

and wherein $J_i$ is the objective function, $E_i$ is the error function of the computations for controlling, $r_i$ is the preset temperature, and $y_i$ is the electronic-device temperature, for i: 1~n.

14. The heat dissipation control system as recited in claim 13, wherein the back propagation algorithm is adapted to adjust a weighted value of an artificial neural network for making the object function close to a minimal value, and the back propagation algorithm is defined as:

$$W_{hy}(k+1) = W_{hy}(k) - \eta \frac{\partial J_i}{\partial W_{hy}(k)}$$

and wherein $J_i$ is the objective function, $W_{hyi}$ is the weighted value of the artificial neural network, k is sampling point, (k+1) is a next sampling point, and $\eta$ is an adjustment speed rate, for i: 1~n.

15. The heat dissipation control system as recited in claim 14, wherein $$\frac{\partial J_i}{\partial W_{hyi}} = \frac{\partial J_i}{\partial E_i}\frac{\partial E_i}{\partial y_i}\frac{\partial y_i}{\partial v_i}\frac{\partial x_{yi}}{\partial u_{yi}}\frac{\partial u_{yi}}{\partial W_{hyi}}$$

and wherein $J_i$ is the objective function, $E_i$ is the error functions of the computation for controlling, $y_i$ is the electronic-device temperature, $v_i$ is the control signals, $x_{yi}$ is an output of the computation for controlling, and $u_{yi}$ is an input of the computation for controlling, for i: 1~n.

16. The heat dissipation control system as recited in claim 15, wherein $$\frac{\partial J_i}{\partial E_i} = (r_i - y_i)$$

$$\frac{\partial E_i}{\partial y_i} = -1$$

$$\frac{\partial y_i}{\partial v_i} = \text{sgn}[(y_i(k) - y_i(k-1)) * (v_i(k-1) - v_i(k-2)]$$

-continued $$\frac{\partial x_{yi}}{\partial u_{yi}} = 1$$

$$\frac{\partial u_{yi}}{\partial W_{hyi}} = x_{hi}$$

and wherein $J_i$ is the objective function, $E_i$ is the error functions of the computation for controlling, $r_i$ is the preset temperatures, $y_i$ is the electronic-device temperature, k is a sampling point, (k−1) is a last sampling point, $v_i$ is the control signals, $x_{yi}$ is an output of the computation for controlling, $u_{yi}$ is an input of the computation for controlling, $W_{hyi}$ is the weighted value of the artificial neural network, and $x_{hi}$ is a gain variable.

17. The heat dissipation control system as recited in claim 16, wherein each of the gain variables includes a ratio parameter, a differential parameter, and an integral parameter, and wherein the ratio parameter, the differential parameter, and the integral parameter are respectively defined as:

$$x_{hi1}(k) = \begin{cases} 1, & u_{hi1}(k) > 1 \\ u_{hi1}(k), & -1 \leq u_{hi1}(k) \leq 1 \\ -1, & u_{hi1}(k) < -1 \end{cases}$$

$$x_{hi2}(k) = \begin{cases} 1, & u_{hi2}(k) > 1 \\ u_{hi2}(k) + u_{hi2}(k-1), & -1 \leq u_{hi2}(k) \leq 1 \\ -1, & u_{hi2}(k) < -1 \end{cases}$$

$$x_{hi3}(k) = \begin{cases} 1, & u_{hi3}(k) > 1 \\ u_{hi3}(k) - u_{hi3}(k-1), & -1 \leq u_{hi3}(k) \leq 1 \\ -1, & u_{hi3}(k) < -1 \end{cases}$$

and wherein $x_{hi1}$ is the ratio parameter of one of the gain variables, $x_{hi2}$ is the integral parameter of one of the gain variables, and $x_{hi3}$ is the differential parameter of one of the gain variables, for i: 1~n.

18. The heat dissipation control system as recited in claim 14, wherein the first fan has a plurality of weighted values corresponding to each part of the server, and wherein each of the control signals is multiplied by each of the weighted values generated by the artificial neural network computing unit for generating a plurality of driving signals.

19. The heat dissipation control system as recited in claim 18, wherein the first fan receives the driving signals at the same time and is driven by the driving signal corresponding to a highest rotational speed value.

20. The heat dissipation control system as recited in claim 14, wherein the fan unit further comprises a second fan, the second fan having a plurality of weighted values corresponding to each part of the server, wherein each of the control signals is multiplied by each of the weighted values generated by each of the artificial neural network computing units for generating a plurality of driving signals.

* * * * *